US012771819B1

(12) United States Patent
Strandborg et al.

(10) Patent No.: US 12,771,819 B1
(45) Date of Patent: Oct. 20, 2026

(54) PREDICTIVE BACKLIGHT CONTROL

(71) Applicant: Distance Technologies Oy, Helsinki (FI)

(72) Inventors: Mikko Strandborg, Hangonkylä (FI); Harri Kapanen, Espoo (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/532,540

(22) Filed: Feb. 6, 2026

(51) Int. Cl.

| | |
|---|---|
| ***H04N 13/398*** | (2018.01) |
| ***H04N 13/327*** | (2018.01) |
| ***H04N 13/373*** | (2018.01) |
| ***H04N 13/376*** | (2018.01) |
| ***H04N 13/378*** | (2018.01) |

(52) U.S. Cl.
CPC ......... *H04N 13/398* (2018.05); *H04N 13/327* (2018.05); *H04N 13/373* (2018.05); *H04N 13/376* (2018.05); *H04N 13/378* (2018.05)

(58) Field of Classification Search
CPC .. H04N 13/398; H04N 13/327; H04N 13/373; H04N 13/376; H04N 13/378
See application file for complete search history.

(56) References Cited

U.S. PATENT DOCUMENTS

2015/0109286 A1* 4/2015 Verbeure .............. G09G 3/3406 345/545
2016/0366423 A1* 12/2016 Laserre ................ H04N 19/172
2021/0072823 A1* 3/2021 Selan ................... G02B 27/017
2023/0230527 A1* 7/2023 Chung ..................... G09G 3/36 345/699

* cited by examiner

*Primary Examiner* — Andrew Sasinowski
(74) *Attorney, Agent, or Firm* — Ziegler IP Law Group, LLC.

(57) ABSTRACT

A display system and method are disclosed. The display system has a display including a backlight unit that includes a plurality of backlight regions that are individually controllable. The display system further includes at least one processor configured to obtain motion information indicating motion of image content across a sequence of at least two image frames; determine, based on the motion information, a predicted backlight state for a next image frame to be presented on the display, wherein the predicted backlight state indicates respective emission levels for the plurality of backlight regions; and control the plurality of backlight regions for presentation of the next image frame on the display, based on the predicted backlight state.

20 Claims, 3 Drawing Sheets

PREDICTIVE BACKLIGHT CONTROL

TECHNICAL FIELD

The present disclosure relates to backlight control. More particularly, the present disclosure relates to display systems for controlling emission levels of a plurality of backlight regions in a backlight unit of a display. The present disclosure also relates to methods for controlling emission levels of a plurality of backlight regions in a backlight unit of a display.

BACKGROUND

Certain display applications impose stringent requirements on motion-to-photons latency. In particular, augmented-reality (AR) displays, including glasses-free AR head-up displays (HUDs), require extremely low motion-to-photons latency to maintain visual stability and user comfort. One component of this latency is the time interval between image data being provided to the display over an interface such as DisplayPort, HDMI, or MIPI, and the corresponding light being emitted by the display, commonly referred to as input lag. In conventional display systems, this input lag may span multiple image frames, where, for example, a single frame at a refresh rate of 60 Hz corresponds to approximately 16.66 milliseconds.

Displays incorporating backlight units with a plurality of backlight regions that are individually controllable are increasingly applied in latency-sensitive contexts. Such displays are used to improve contrast ratio, dynamic range, and power efficiency, and are commonly referred to as Full-Area Local Dimming (FALD) or Mini-LED displays. In such displays, emission levels for individual backlight regions are adjusted based on image content presented on the display.

In this regard, additional processing is performed to analyse image content and to determine respective emission levels for the backlight regions. Such analysis necessitates availability of image data of an image to be displayed prior to the backlight control process, which further contributes to display latency.

Thus, managing emission levels for backlight regions without introducing additional delay that adversely affects the temporal correspondence between image content and emitted light remains a technical challenge.

SUMMARY

The present disclosure seeks to provide a display system and method for controlling emission levels of a plurality of backlight regions in a backlight unit of a display, while reducing display latency associated with backlight control and preserving temporal correspondence between image content and emitted light, particularly in latency-sensitive display applications. The aim of the present disclosure is achieved by a display system and method that obtain motion information indicating motion of image content across a sequence of image frames prior to availability of image data of the next image frame, determine a predicted backlight state for a next image frame based on the motion information, and control respective emission levels of the plurality of backlight regions for presentation of the next image frame based on the predicted backlight state, as defined in the appended independent claims to which reference is made. Advantageous features, including calculating motion information based on head movement, vehicle motion, or real-world object motion, are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 1B depicts an example image frame, while

DETAILED DESCRIPTION OF EMBODIMENTS

Figure 1A:
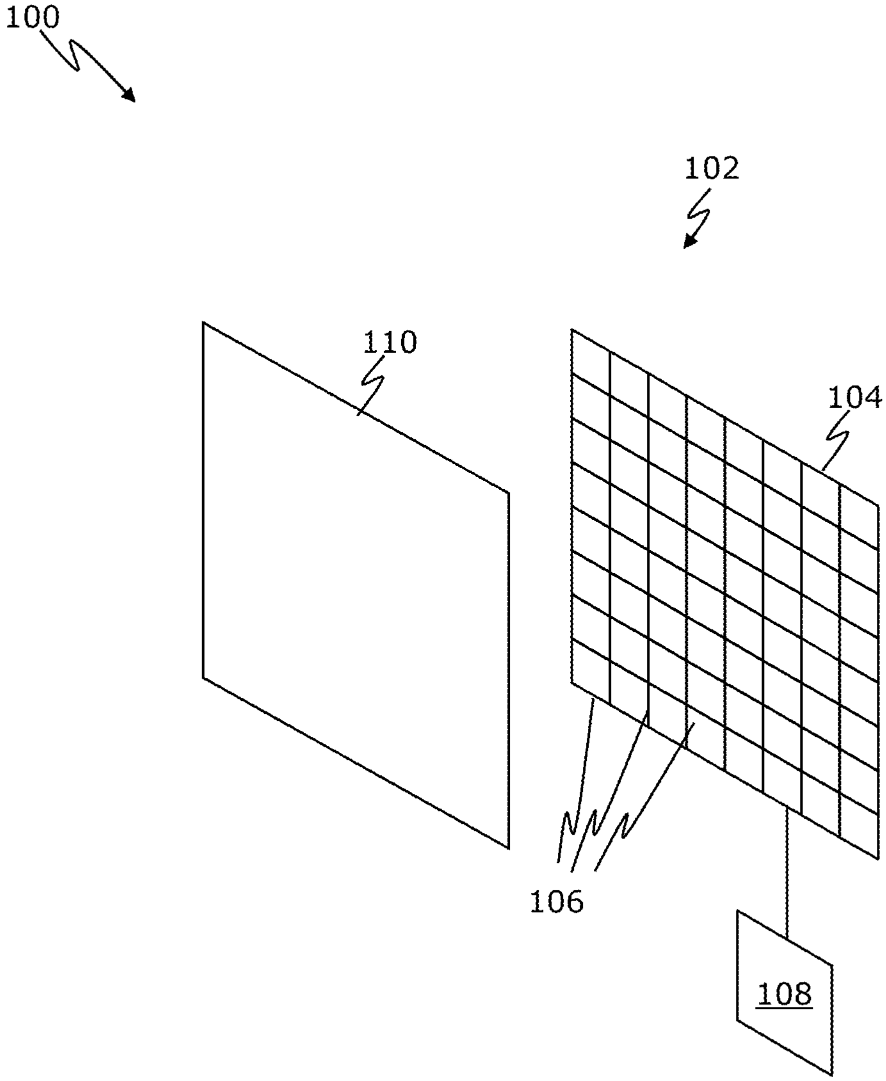
FIG. 1A is a schematic illustration of a system for controlling emission levels of a plurality of backlight regions in a backlight unit of a display, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a display system comprising:

- a display comprising a backlight unit that includes a plurality of backlight regions that are individually controllable; and
- at least one processor configured to:
  - obtain motion information indicating motion of image content across a sequence of at least two image frames;
  - determine, based on the motion information, a predicted backlight state for a next image frame to be presented on the display, wherein the predicted backlight state indicates respective emission levels for the plurality of backlight regions; and
  - control the plurality of backlight regions for presentation of the next image frame on the display, based on the predicted backlight state.

In a second aspect, an embodiment of the present disclosure provides a method comprising:

- obtaining motion information indicating motion of image content across a sequence of at least two image frames;
- determining, based on the motion information, a predicted backlight state for a next image frame to be presented on a display, wherein the display comprises a backlight unit that includes a plurality of backlight regions that are individually controllable, wherein the predicted backlight state indicates respective emission levels for the plurality of backlight regions; and controlling the plurality of backlight regions for presentation of the next image frame on the display, based on the predicted backlight state.

Pursuant to the present disclosure, the display system and method facilitate predictive control of emission levels of a plurality of backlight regions in a backlight unit in a manner that reduces display latency associated with the backlight control. This is achieved by determining a predicted backlight state for a next image frame based on motion information indicating motion of image content across a sequence of image frames, and by controlling the backlight regions for presentation of the next image frame based on the predicted backlight state, rather than relying on analysis of image data of the next image frame prior to the presentation of the next image frame.

By determining the predicted backlight state in advance of presentation of the next image frame, the display system and method reduce or eliminate latency that would otherwise be introduced by performing backlight analysis only after the image data of the next image frame becomes available. As a result, emission levels of the backlight regions can be controlled predictively without postponing presentation of the next image frame or delaying backlight response relative to the image content.

Furthermore, controlling the backlight regions for presentation of the next image frame based on the predicted backlight state improves temporal correspondence between image content of the next image frame and emitted light corresponding to the next image frame. This mitigates misalignment between displayed image content and backlight emission that may otherwise occur when backlight control lags behind changes in image content during motion.

By mitigating latency in backlight control while preserving synchronization between image content and backlight emission, the display system and method support display operation in latency-sensitive contexts in which strict motion-to-photons timing is required. As a result, the display system and method are able to maintain responsive visual output while benefiting from the use of a backlight unit having a plurality of individually controllable backlight regions.

It will be appreciated that the display may be implemented in various ways, including a heads-up display (HUD) in a vehicle, a head-mounted display, an augmented reality (AR) display, or an autostereoscopic display, among others. In some implementations, the display is a transparent display. In the case of an HUD, such a transparent display may be integrated into a windshield of the vehicle. An example of such a transparent display is described in U.S. Pat. No. 12,477,095, titled "Augmenting Reality with Multiscopic See-through Display", which is incorporated herein by reference. In other implementations, the display is a non-transparent display used in conjunction with an optical combiner, wherein the optical combiner is arranged on an optical path of the non-transparent display and on an optical path of light from a real-world environment. In the case of an HUD, the optical combiner may be integrated into the windshield of the vehicle.

It will further be appreciated that the display system and method are not limited to implementation in an HUD, and may be employed in a variety of other applications, including signage, 3D product demonstrations, immersive educational visualizations, and training simulations, among others.

While the techniques described herein are particularly advantageous in latency-sensitive display applications such as augmented-reality displays and head-up displays, it will be appreciated that the disclosed predictive backlight control is equally applicable to general-purpose displays employing full-area local dimming or mini-LED backlight units, including televisions, monitors, and other flat-panel displays in which backlight control latency impacts visual quality.

For illustration purposes only, there will now be described how the aforementioned steps can be performed pursuant to embodiments of the present disclosure.

Obtaining Motion Information:

The motion information indicates motion of image content across a sequence of at least two image frames. Thus, the motion information represents how image content changes position between different image frames. Such motion information is used as a basis for determining a predicted backlight state for a next image frame.

Importantly, the motion information is obtained prior to availability of pixel-level image data of the next image frame, such that the motion information can be used to determine the predicted backlight state before image data of the next image frame is available.

Throughout the present disclosure, the "sequence of at least two image frames" does not require that the image frames be consecutive in time. Rather, the sequence may comprise any two or more image frames that are temporally related and usable to determine motion of image content. For example, the sequence may include consecutive image frames, non-consecutive image frames, image frames selected from a buffered or windowed set of image frames, image frames obtained via look-ahead decoding of a compressed video stream, or image frames selected according to a predictive or frame-skipping pipeline. The image frames of the sequence may therefore be separated by one or more intervening image frames.

The motion information may be represented in any suitable coordinate space, such as a display-centric coordinate space, provided that the motion information is defined consistently with respect to the image frames for which the predicted backlight state is to be determined.

Optionally, the motion information comprises motion vectors that describe positional displacement of image content between a given image frame and a previous image frame. The motion vectors may be represented in a two-dimensional coordinate space corresponding to the display, such that each motion vector indicates a direction and magnitude of motion of image content in a screen space of the display. The direction and magnitude of the motion vectors may be expressed in any suitable units, including pixels, millimetres, or normalized coordinates in the screen space of the display. Optionally, the motion vectors are represented in a vector map in which respective screen-space locations (or blocks/regions) are associated with respective two-dimensional motion vectors.

In some implementations, when obtaining the motion information, the at least one processor is configured to generate the motion vectors by comparing image content of respective image frames in the sequence.

In other implementations, when obtaining the motion information, the at least one processor is configured to receive the motion information from an image generation unit that generates the sequence of at least two image frames. For example, when the image frames are generated by a rendering pipeline, the motion information may be generated as part of the rendering process and provided to the at least one processor. In such cases, the motion information may correspond to motion of virtual objects or image elements as determined by the image generation unit.

By receiving the motion information from the image generation unit that generates the sequence of image frames, the display system utilizes motion data that is inherently consistent with the generated image content. This enables accurate determination of predicted backlight states based on known motion of image content, without requiring additional image analysis. As a result, predictive backlight control can be integrated directly with the image generation process while maintaining temporal coherence between generated image content and backlight emission.

In further implementations, when obtaining the motion information, the at least one processor is configured to retrieve the motion information from a compressed video stream used to generate the sequence of at least two image frames. In such implementations, the motion information is obtained from encoded image data associated with the sequence of image frames. For example, when the sequence of image frames is provided in a compressed format, the motion information may be retrieved from data structures used to encode temporal relationships between image frames. Such motion information may be obtained without decoding the image frames into full-resolution image data.

By retrieving the motion information from the compressed video stream used to generate the sequence of image frames, the display system leverages motion data that is already available as part of video encoding. This avoids redundant computation of the motion information from decoded image data and enables determination of the predicted backlight state with reduced processing overhead and reduced latency. As a result, predictive backlight control can be performed efficiently even when image frames are not yet decoded into full-resolution image data.

In some implementations, motion information is obtained from both a compressed video stream and an image generation unit. In such cases, motion information retrieved from encoded image data and motion information received from the image generation unit are combined to determine the motion of image content across the sequence of at least two image frames.

It will be appreciated that in most implementations, the next image frame is successive to, and not part of, the sequence of at least two image frames used to obtain the motion information. This is because the predicted backlight state is determined before image data of the next image frame becomes available. For example, motion of image content between a first image frame and a second image frame may be used to determine a predicted backlight state for a third image frame, which constitutes the next image frame to be presented on the display.

However, in some implementations, motion information for the next image frame may be available in advance. For example, when image frames are obtained from a compressed video stream or a predictive image pipeline, motion information associated with one or more future image frames may be accessible prior to full availability of pixel-level image data of those image frames. In such cases, the next image frame may be included among the at least two image frames for which the motion information is obtained.

Accordingly, the sequence of at least two image frames used to obtain the motion information may comprise image frames that precede the next image frame in time, may comprise image frames that include the next image frame, or may comprise image frames that are temporally separate from the next image frame, provided that the motion information enables determination of the predicted backlight state for the next image frame.

Determining Predicted Backlight State:

The predicted backlight state indicates respective emission levels for the plurality of backlight regions for a next image frame to be presented on the display. The predicted backlight state is determined based on the motion information indicating motion of image content across the sequence of at least two image frames.

When determining the predicted backlight state, the at least one processor is configured to use the motion information to estimate how image content corresponding to one or more backlight regions in a current image frame is expected to be positioned in the next image frame. By performing such estimation for the image content of the current image frame, the at least one processor determines respective emission levels for the plurality of backlight regions for the next image frame.

In some implementations, when determining the predicted backlight state, the at least one processor is configured to identify, for a given backlight region, a portion of the image content that is expected to move into the given backlight region in the next image frame based on the motion information. The emission level for the given backlight region in the predicted backlight state may then be determined based on intensity values associated with the identified portion of the image content.

In other implementations, when determining the predicted backlight state, the at least one processor is configured to map one or more backlight regions used to display a portion of image content for the current image frame to corresponding backlight regions used to display the same portion of the image content for the next image frame, based on motion information corresponding to that portion of the image content. In such cases, emission levels for the backlight regions in the predicted backlight state may be determined by propagating emission levels of the one or more backlight regions from the current image frame to the next image frame according to the motion information.

In further implementations, when determining the predicted backlight state, the at least one processor is configured to determine, for a given backlight region, multiple portions of image content that are predicted, based on the motion information, to be displayed within that backlight region in the next image frame. In such cases, the emission level for the given backlight region in the predicted backlight state may be determined by combining emission levels of respective backlight regions that are used to display the multiple portions of the image content in the current image frame.

In some implementations, when determining the predicted backlight state, the at least one processor is configured to determine, for a given backlight region, a target emission level for the next image frame based on a comparison of multiple candidate intensity values. In such implementations, the at least one processor is configured to determine, for the given backlight region, a first candidate intensity value corresponding to a highest pixel intensity of any pixel located within the region of the current image frame associated with the given backlight region. The first candidate intensity value provides a baseline emission level that ensures illumination of image content currently present within the given backlight region. The at least one processor is further configured to determine a second candidate intensity value corresponding to a highest pixel intensity of any pixel that is predicted, based on the motion information, to move into the given backlight region in the next image frame. The second candidate intensity value represents an anticipated illumination requirement derived from predicted motion of image content. The target emission level for the given backlight region in the predicted backlight state may then be determined based on a maximum of the first candidate intensity value and the second candidate intensity value. In this manner, the predicted backlight state accounts both for image content currently present within the given backlight region and for image content expected to enter the given backlight region in the next image frame.

The predicted backlight state may be represented as a set of values corresponding to the plurality of backlight regions, wherein each value represents a target emission level for a respective backlight region for the next image frame. The predicted backlight state may be determined and updated on a frame-by-frame basis.

The determination of the predicted backlight state may be performed independently of availability of full image data of the next image frame. In such cases, the predicted backlight state is determined prior to presentation of the next image frame and stored for use when controlling the backlight regions for presentation of the next image frame.

Controlling Backlight Regions Based on Predicted Backlight State:

The predicted backlight state provides, for each backlight region, a target emission level to be applied during presentation of the next image frame. When controlling the plurality of backlight regions, the at least one processor applies the respective target emission levels to the corresponding backlight regions such that the backlight unit emits light in accordance with the predicted backlight state during presentation of the next image frame.

In some implementations, controlling the plurality of backlight regions comprises providing control signals to a backlight driver circuit of the backlight unit. The control signals indicate the respective emission levels to be applied to the plurality of backlight regions for the next image frame. The backlight driver circuit may then drive light sources corresponding to the backlight regions according to the control signals.

In other implementations, controlling the plurality of backlight regions comprises updating backlight control parameters stored in a memory or register structure accessible to backlight control hardware. In such cases, the updated backlight control parameters define the emission levels of the plurality of backlight regions to be applied during presentation of the next image frame.

The control of the plurality of backlight regions based on the predicted backlight state is performed in coordination with presentation of the next image frame on the display. In particular, the predicted backlight state determined for the next image frame is applied to the backlight regions during presentation of that next image frame. As a result, the predicted backlight state can be applied to the backlight unit without introducing any additional frame-level delay relative to presentation of the next image frame.

The control of the plurality of backlight regions based on the predicted backlight state may be performed on a frame-by-frame basis, such that a predicted backlight state is determined for each image frame and used to control the backlight regions during presentation of the corresponding image frame.

In some implementations, the display is not a head-mounted display, and the motion information comprises motion vectors. In such implementations, when obtaining the motion information, the at least one processor is configured to:

obtain information indicative of a head movement of a user; and calculate the motion vectors based at least in part on the head movement, to represent motion of the image content in a same direction as the head movement.

The information indicative of the head movement may represent at least one of a translation or a rotation of the user's head relative to an image plane of the display. Such information may be obtained using one or more cameras configured to capture images of the user. When obtaining the information indicative of the head movement, the at least one processor may be configured to determine changes in a position and/or an orientation of the user's head between successive points in time.

When calculating the motion vectors based at least in part on the head movement, the at least one processor is configured to determine an apparent motion of the image content on the display that results from the head movement. In particular, for a display that is not head-mounted, movement of the user's head relative to the display causes the image content presented on the display to appear to move in the same direction as the head movement in the screen space of the display.

Accordingly, the at least one processor calculates the motion vectors such that the motion vectors represent the motion of the image content in the same direction as the head movement. A magnitude of the motion vectors may be determined based on a magnitude of the head movement and a geometric relationship between the user and the image plane.

By calculating the motion vectors based at least in part on head movement of the user for displays that are not head-mounted, the display system accounts for the apparent motion of the image content caused by user movement relative to the image plane. This allows the motion information to reflect changes in perceived image position even when the image content itself is static. In particular, this maintains spatial stability of image content rendered at a given perceived depth by preserving correct parallax behaviour during the head movement of the user relative to the display.

By representing motion of image content in the same direction as the head movement, the system and method enable prediction of backlight region emission levels that remain aligned with the perceived position of the image content during head movement. This improves temporal correspondence between perceived image content and backlight emission during user motion. As a result, predictive backlight control remains effective in non-head-mounted display configurations in which user head movement contributes to apparent image motion, supporting consistent visual output in latency-sensitive display applications.

In some sub-implementations, the display is an autostereoscopic display. In such sub-implementations, for image content anchored to a real-world object, the motion vectors are calculated based further on a perceived distance of the image content from the user. The perceived distance of the image content from the user represents an estimated virtual depth at which the image content is perceived relative to the user. Such perceived distance may be obtained from rendering data associated with the image content, or from other information indicative of how the image content is positioned relative to the user.

When calculating the motion vectors based further on the perceived distance, the at least one processor is configured to account for parallax effects associated with user movement relative to the autostereoscopic display. In particular, for image content anchored to a real-world object, a magnitude of apparent motion of the image content on the display caused by user movement varies as a function of the perceived distance of the image content from the user.

Accordingly, the at least one processor calculates the motion vectors such that the motion vectors represent motion of the image content that is scaled based on the perceived distance of the image content from the user. Image content perceived to be closer to the user may be associated with larger apparent motion on the display for a given user movement, while image content perceived to be farther from the user may be associated with smaller apparent motion.

By calculating motion vectors based further on the perceived distance of image content, the display system accounts for depth-dependent parallax effects associated with user movement. This allows the motion information to more accurately represent apparent motion of image content as perceived by the user.

By scaling motion vectors according to the perceived distance, predictive backlight control remains aligned with depth-varying motion of image content in autostereoscopic presentation. This improves correspondence between perceived image position and backlight emission for image content anchored to real-world objects. As a result, predictive backlight control operates consistently across image content at different perceived depths in autostereoscopic displays, supporting stable visual presentation when user movement induces depth-dependent apparent motion.

Moreover, in some implementations where the display is an autostereoscopic display, when obtaining the motion information, the at least one processor is configured to:

obtain motion information separately for different view images corresponding to different viewpoints; and combine the motion information obtained for the different view images.

Each view image corresponds to image content generated for presentation from a respective viewpoint in the autostereoscopic display. When obtaining the motion information separately for the different view images, the at least one processor determines motion of image content within each view image independently, such that motion information for one view image is not assumed to be identical to motion information for another view image.

The motion information for each view image may be obtained using any of the techniques described above, including generation from different image frames, reception from an image generation unit, or retrieval from encoded image data. In such cases, the motion information for each view image reflects motion of image content as represented in the respective view image.

When combining the motion information obtained for the different view images, the at least one processor is configured to produce a combined motion information representation that accounts for motion indicated in the respective motion information for the different view images. The combined motion information may be determined by aggregating, merging, or otherwise combining the respective motion information for the different view images. The combined motion information is then used as the motion information for determining the predicted backlight state for a next image frame in the autostereoscopic display, as described above.

In some implementations, processing associated with determination of the predicted backlight state is performed by a graphics processing unit (GPU), a dedicated hardware block, or a processor that performs stereo image processing for the autostereoscopic display. In such implementations, obtaining the motion information for different view images corresponding to different viewpoints separately prior to combination allows motion processing to be performed on view images having reduced pixel counts relative to a combined or interleaved representation, and allows motion information for each view image to remain internally consistent with the corresponding view image.

Processing motion information separately for different view images prior to combination reduces computational load by operating on lower-resolution per-view image data and preserves consistency of motion vectors within each view image before combination.

This allows the display system to account for view-dependent differences in motion of image content. This avoids assuming identical motion across different view images and enables more accurate representation of motion as perceived from different viewpoints. Accordingly, the display system derives motion information that reflects collective motion of image content across the autostereoscopic views. This supports determination of predicted backlight states that remain consistent with multi-view image presentation. As a result, predictive backlight control operates coherently with autostereoscopic image generation, supporting stable backlight behaviour when different view images exhibit differing motion characteristics.

Furthermore, in some implementations where the display is an autostereoscopic display, the at least one processor is configured to adjust a crosstalk compensation applied to image data of the next image frame based at least in part on the predicted backlight state.

Crosstalk compensation refers to processing applied to image data to reduce leakage of light intended for one viewpoint into another viewpoint in an autostereoscopic display. Such compensation may be applied during generation or processing of the image data prior to presentation on the display.

When adjusting the crosstalk compensation based at least in part on the predicted backlight state, the at least one processor is configured to account for emission levels of the plurality of backlight regions that are predicted to be applied during presentation of the next image frame. In particular, variations in predicted emission levels across backlight regions may influence an amount of optical crosstalk between view images.

Accordingly, the at least one processor adjusts parameters of the crosstalk compensation applied to the image data of the next image frame based on the predicted backlight state. The adjustment may be performed such that the crosstalk compensation is tailored to the backlight emission conditions expected during presentation of the next image frame. The adjusted image data is then presented on the autostereoscopic display while the backlight regions are controlled based on the predicted backlight state, as described above.

The image data to which the crosstalk compensation is applied may correspond to different stages of image processing within the display system. In some implementations, the crosstalk compensation is applied to per-view image data corresponding to individual view images generated for respective viewpoints. In other implementations, the crosstalk compensation is applied to intermediate image representations produced during image generation or processing, prior to final composition for display. In further implementations, the crosstalk compensation is applied to image data that has been pre-composited or post-processed, such that the compensation operates on image data that already incorporates contributions from multiple views or processing stages.

This allows crosstalk compensation to remain aligned with backlight conditions expected during presentation of the next image frame. By tailoring crosstalk compensation to predicted backlight emission rather than fixed or delayed backlight conditions, the system improves consistency between image data processing and actual light emission. This supports more effective suppression of crosstalk between view images under varying backlight states. As a result, predictive backlight control and crosstalk compensation operate in a coordinated manner in autostereoscopic displays, supporting stable view separation and consistent visual quality during motion.

Moreover, in some implementations, the display is mounted on a vehicle, and the motion information comprises motion vectors. In such implementations, when obtaining the motion information for image content not anchored to at least one of: the vehicle, a head of a user, the display, the at least one processor is configured to:

obtain information indicative of a change in at least one of: a velocity, an acceleration, an orientation of the vehicle; and calculate the motion vectors based at least in part on the change in the at least one of: the velocity, the acceleration, the orientation of the vehicle.

The information indicative of the change in the at least one of: the velocity, the acceleration, the orientation of the vehicle represents motion of the vehicle relative to an external reference frame (hereinafter referred to as "vehicle motion state"). Such information may be obtained from one or more vehicle sensors, including inertial sensors, motion sensors, or vehicle state sensors, or from vehicle systems that provide motion-related data. When obtaining such information, the at least one processor may be configured to determine changes in the vehicle motion state between successive points in time.

When calculating the motion vectors based at least in part on the change in the vehicle motion state, the at least one processor is configured to determine apparent motion of image content on the display that results from motion of the vehicle. In particular, for image content that is not anchored to the vehicle, the user's head, or the display, changes in vehicle velocity, acceleration, or orientation cause the image content to appear to move relative to the display.

Accordingly, the at least one processor calculates the motion vectors such that the motion vectors represent motion of the image content resulting from the change in the vehicle motion state. The direction and magnitude of the motion vectors may be determined based on the direction and magnitude of the change in the at least one of: the velocity, the acceleration, the orientation of the vehicle, and a geometric relationship between the vehicle, the display, and the image content.

By calculating motion vectors based at least in part on changes in vehicle velocity, acceleration, or orientation for vehicle-mounted displays, the display system accounts for apparent motion of image content caused by vehicle motion. This allows the motion information to reflect changes in perceived image position that arise independently of motion of the image content itself.

By selectively applying vehicle-motion-based motion information to image content that is not anchored to the vehicle, the user's head, or the display, the display system maintains appropriate differentiation between content that should remain visually stable and content that should exhibit apparent motion in response to vehicle movement. As a result, predictive backlight control remains aligned with perceived motion of image content in vehicle-mounted display configurations, supporting consistent visual output during vehicle motion in latency-sensitive display applications.

Furthermore, in some implementations, the display is a head-mounted display worn by a user, and the motion information comprises motion vectors. In such implementations, when obtaining the motion information, the at least one processor is configured to:

obtain information indicative of a head movement of the user; and calculate the motion vectors, based at least in part on the head movement, to represent motion of the image content in a direction opposite to a direction of the head movement.

The information indicative of the head movement may represent at least one of a translation or a rotation of the user's head. Head rotation refers to a change in orientation of the head. Such information may be obtained using one or more sensors integrated into the head-mounted display, including inertial sensors, orientation sensors, or tracking sensors. Additionally or alternatively, such information may be obtained using outside-in tracking by employing one or more cameras configured to capture images of the user. When obtaining the information indicative of the head movement, the at least one processor may be configured to determine changes in a position and/or an orientation of the user's head between successive points in time.

When calculating the motion vectors based at least in part on the head movement, the at least one processor is configured to determine an apparent motion of the image content on the display that results from the head movement. In particular, for a head-mounted display, movement of the user's head causes image content that is fixed relative to a virtual or real-world reference frame to appear to move in a direction opposite to the direction of the head movement in the screen space of the display.

Accordingly, the at least one processor calculates the motion vectors such that the motion vectors represent motion of the image content in a direction opposite to the direction of the head movement. A magnitude of the motion vectors may be determined based on a magnitude of the head movement and a geometric relationship between the user's head and the display.

In head-mounted display implementations, rotational movement of the user's head causes apparent panning of image content on the display in a direction opposite to the direction of the head rotation. Such apparent panning may be represented in the motion information as a substantially uniform motion component across the image content.

In some implementations, this apparent panning is represented as a direct-current (DC) component of the motion vectors, wherein a common motion vector is applied across a region or an entirety of the image. In other implementations, the apparent panning is represented as a static motion vector map that is scaled based on a magnitude of the head rotation. The scaling may be determined based on a geometric relationship between the head-mounted display, the user's head, and the image plane. These representations allow head-rotation-induced apparent motion to be incorporated into the motion information without requiring per-pixel motion estimation.

By calculating the motion vectors based at least in part on head movement of the user for a head-mounted display, the display system accounts for apparent motion of image content induced by the head movement of the user (and therefore the movement of the head-mounted display itself). This allows the motion information to reflect perceived motion of image content even when the image content remains spatially fixed relative to a virtual or real-world reference frame.

By representing motion of image content in a direction opposite to the direction of the head movement, the display system correctly models head-centric viewing behaviour inherent to head-mounted displays. This enables predictive backlight control to remain aligned with perceived image motion during rapid head movements. As a result, predictive backlight control remains effective in head-mounted display configurations, supporting stable visual output and consistent backlight behaviour in latency-sensitive head-mounted display applications.

Moreover, in some implementations, the display is an augmented-reality display. In such implementations, when obtaining the motion information for image content anchored to a real-world object, the at least one processor is configured to:

obtain information indicative of a change in at least one of: a position, an orientation, a velocity, an acceleration of the real-world object; and calculate the motion vectors based at least in part on the change in the at least one of: the position, the orientation, the velocity, the acceleration of the real-world object.

The information indicative of the change in the at least one of: the position, the orientation, the velocity, the acceleration of the real-world object represents motion of the real-world object relative to the user and the display (hereinafter referred to as "the motion state of the real-world object"). Such information may be obtained from one or more sensors configured to observe the real-world object, or from one or more real-world-facing cameras configured to capture images of the real-world object. When obtaining such information, the at least one processor may be configured to determine changes in the motion state of the real-world object between successive points in time.

When calculating the motion vectors based at least in part on the change in the motion state of the real-world object, the at least one processor is configured to determine apparent motion of the image content on the display that results from motion of the real-world object to which the image content is anchored. In particular, for image content anchored to the real-world object, changes in the position, orientation, velocity, or acceleration of the real-world object cause corresponding apparent motion of the image content in the screen space of the display.

Accordingly, the at least one processor calculates the motion vectors such that the motion vectors represent motion of the image content resulting from the change in the motion state of the real-world object. A direction and a magnitude of the motion vectors may be determined based on the direction and magnitude of the change in the position, the orientation, the velocity, or the acceleration of the real-world object, and a geometric relationship between the real-world object, the user, and the display.

By calculating motion vectors based at least in part on changes in position, orientation, velocity, or acceleration of a real-world object for image content anchored to that object in an augmented-reality display, the display system accounts for apparent motion of image content induced by motion of the real-world object itself. This allows the motion information to reflect changes in perceived image position that arise independently of user movement or display movement.

By aligning motion information with real-world-object motion, predictive backlight control remains synchronized with image content that is spatially registered to moving real-world objects. This improves temporal correspondence between perceived image content and backlight emission for augmented-reality content anchored to real-world objects. As a result, predictive backlight control remains effective in augmented-reality display configurations involving moving real-world objects, supporting stable visual presentation and consistent backlight behaviour under dynamic real-world conditions.

Moreover, the motion information may be provided at a spatial resolution that differs from a spatial resolution of the image frames. Optionally, in this regard, the motion information comprises motion vectors having a spatial resolution lower than a spatial resolution of image data of the sequence of at least two image frames. For example, the motion information may be defined per backlight region, per group of pixels, or per block of image data.

In some implementations, the motion information is provided at a spatial granularity corresponding to the plurality of backlight regions of the backlight unit, such as a matrix of backlight regions of a full-area local dimming (FALD) backlight unit. In such cases, each motion vector represents motion of image content associated with a corresponding backlight region or a group of pixels influenced by that backlight region. The spatial resolution of the motion information is selected such that the motion information indicates motion of image content across the sequence of image frames with sufficient granularity to support determination of the predicted backlight state.

By using motion information having a spatial resolution lower than a spatial resolution of the image data, the display system reduces data bandwidth and computational complexity associated with motion processing. This allows prediction of backlight states to be performed at a granularity aligned with backlight regions rather than individual pixels, while still providing sufficient accuracy for backlight control. As a result, predictive backlight control can be achieved with reduced processing cost and improved scalability to displays having a large number of pixels.

Furthermore, optionally, when controlling the plurality of backlight regions based on the predicted backlight state, the at least one processor is configured to apply temporal conditioning to the respective emission levels for the plurality of backlight regions.

The term "temporal conditioning" refers to modifying emission levels of the display over time to manage temporal behaviour of emitted light. Temporal conditioning may include one or more of: reducing abrupt changes in emission level, limiting high-frequency temporal variations in emission, shaping transitions between emission levels, or stabilizing emission levels against temporal artifacts such as flicker. Temporal conditioning may include, for example, temporal blending of emission levels, temporal smoothing of emission levels, or ramping of emission levels.

During temporal conditioning, target emission levels for the backlight regions are modified based on emission levels applied during one or more previous image frames. When applying temporal conditioning, the at least one processor is configured to determine conditioned emission levels for the backlight regions by taking into account both the predicted backlight state for the next image frame and backlight emission levels applied in one or more preceding image frames. The conditioned emission levels for the plurality of backlight regions are determined prior to generation of control signals for driving the plurality of backlight regions.

In some implementations, applying temporal conditioning comprises limiting a rate of change of emission levels between successive image frames. For example, when a predicted emission level for a given backlight region differs from an emission level applied during a previous image frame, the at least one processor may adjust the emission level to be applied for the next image frame such that the change in emission level occurs progressively over multiple image frames.

In other implementations, applying temporal conditioning comprises filtering or smoothing emission levels over time. In such cases, the conditioned emission level for a given backlight region may be determined based on a temporal combination of the predicted emission level for the next image frame and emission levels applied during one or more previous image frames.

By applying temporal conditioning to emission levels of the plurality of backlight regions, the display system reduces abrupt changes in backlight emission between successive image frames. This supports stable backlight behaviour when predicted backlight states vary over time. This maintains continuity in backlight operation while still responding to predicted changes in image content, and improves consistency between successive backlight states. As a result, predictive backlight control operates smoothly over time, supporting visually stable backlight behaviour during dynamic changes in image content.

Additionally, optionally, when applying the temporal conditioning, an increase in an emission level of a backlight region and a decrease in the emission level of the backlight region are applied differently.

In some implementations, applying an increase in the emission level comprises transitioning the emission level toward a higher target emission level using a first temporal response, while applying a decrease in the emission level comprises transitioning the emission level toward a lower target emission level using a second temporal response that differs from the first temporal response. The first temporal response and the second temporal response may differ in at least one of: a rate, a duration, a profile of change over time.

In other implementations, applying the increase in the emission level and the decrease in the emission level differently comprises using different conditioning parameters or different filtering behaviours for increases and decreases. For example, an increase in emission level may be applied more gradually than a decrease, or a decrease may be applied more gradually than an increase.

By applying increases and decreases in emission levels differently when performing temporal conditioning, the display system provides finer control over temporal behaviour of backlight emission. This allows emission level transitions to be tailored according to the direction of change. This allows the display system to manage backlight transitions in a manner that avoids undesirable visual artifacts associated with symmetric conditioning, thereby improving stability of backlight operation under dynamically changing predicted backlight states. As a result, predictive backlight control achieves smoother and more controlled backlight transitions over time, supporting consistent visual output during changes in image content.

Moreover, optionally, the at least one processor is configured to adjust pixel intensity values of pixels located within a region of the next image frame corresponding to a given backlight region based at least in part on an emission level of the given backlight region as indicated by the predicted backlight state.

The pixels located within the region of the next image frame corresponding to the given backlight region are pixels whose displayed light output is influenced by emission of the given backlight region. When adjusting the pixel intensity values, the at least one processor is configured to take into account the emission level of the given backlight region that is predicted to be applied during presentation of the next image frame.

In some implementations, adjusting the pixel intensity values comprises determining target pixel intensity values for the next image frame such that a combined light output produced by the pixels and the given backlight region corresponds to an intended intensity of the image content. In such cases, the pixel intensity values are adjusted based on the predicted emission level of the given backlight region rather than on an emission level determined after analysis of the next image frame.

For example, an intended pixel colour value for a pixel may correspond to a mid-level grey value, such as a value of (128, 128, 128) in an 8-bit-per-color-channel representation. Conventionally, in a local-dimming display, such an intended pixel value may be achieved by setting a backlight region to approximately 50% of its maximum emission level and driving the corresponding pixel to a higher intensity value, such as (255, 255, 255), to compensate for the reduced backlight emission. In contradistinction, in accordance with the present disclosure, when the emission level of the given backlight region for the next image frame is already predicted based on the motion information and the emission levels used for prior image frames, the at least one processor adjusts the pixel intensity values for the next image frame based on the predicted emission level of the backlight region. Thus, the pixel intensity values are determined in advance to compensate for the predicted backlight emission, rather than being adjusted in response to backlight emission determined after analysis of the next image frame.

Conversely, when the predicted emission level of the backlight region is higher, the at least one processor may adjust the pixel intensity values downward such that the combined contribution of pixel modulation and backlight emission produces the intended intensity of the image content.

In other implementations, adjusting the pixel intensity values comprises applying a compensation function that maps original pixel intensity values to adjusted pixel intensity values based on the predicted emission level of the given backlight region. The compensation function may be applied uniformly to pixels within the region corresponding to the given backlight region or may vary across the region based on local image characteristics.

Image processing operations associated with local dimming displays, including anti-blooming processing and related pixel-level adjustments, may be applied in conjunction with the adjustment of pixel intensity values based on the predicted backlight state. In such cases, the pixel intensity adjustment based on the predicted backlight emission is integrated with such image processing operations.

The adjusted pixel intensity values are then used to generate image data for presentation of the next image frame while the backlight regions are controlled based on the predicted backlight state, as described above.

By adjusting pixel intensity values based at least in part on predicted emission levels of corresponding backlight regions, the display system coordinates pixel-level image modulation with backlight emission that is expected during presentation of the next image frame. This allows pixel intensity adjustment to be performed without waiting for backlight analysis of the next image frame.

By compensating pixel intensity values according to predicted backlight emission rather than delayed or frame-lagged backlight states, the display system improves temporal alignment between pixel output and backlight emission. This supports accurate reproduction of intended image intensities when backlight emission levels vary across frames.

By enabling pixel intensity adjustment to operate directly with predicted backlight emission, existing image processing techniques associated with local dimming displays, including anti-blooming adjustments, remain applicable without modification. As a result, predictive backlight control is integrated with established pixel-level processing while supporting low-latency display operation.

For illustration purposes, there will now be described how various components of the display system can be implemented. The at least one processor of the system controls an overall operation of the system, and is communicably coupled to the display. Optionally, the at least one processor is implemented as a processor of the display. Alternatively, optionally, the at least one processor of the system is implemented as a processor of a computing device that is communicably coupled to the display. Examples of the computing device include, but are not limited to, a laptop, a desktop, a tablet, a phablet, a personal digital assistant, a workstation, and a console. Additionally or alternatively, optionally, the at least one processor of the system is implemented at least partially as a cloud server (namely, a remote server) that provides a cloud computing service.

The term "backlight unit" refers to segmented illumination units that comprise a plurality of backlight regions that are individually controllable (namely, controllable on a per-region basis). Examples of such backlight units include, but are not limited to, full-area local dimming (FALD) backlights and mini-LED backlight units employed in liquid-crystal displays.

In some implementations, the display is an autostereoscopic display. For example, the autostereoscopic display may be any one of: hogel-based, lenticular array-based, lenslet array-based, or parallax barrier-based.

The image plane of the display may be a light-emitting surface of the display or an imaginary plane that is parallel to the light-emitting surface, in a case where the display is viewed directly. Alternatively, in a case where an optical combiner is employed to facilitate a reflected view, the image plane may be an imaginary plane corresponding to the reflected view. The term "image plane" refers to a reference plane associated with presentation of an image by the display, and does not require the display or other optical elements on an optical path to be physically planar. This definition applies irrespective of the optical configuration of the system, namely:

(i) in a case where a distorted image is displayed on a curved or non-curved display and reflected through a curved combiner, (ii) in a case where an undistorted image is displayed on a non-curved display and reflected through a non-curved combiner, (iii) in a case where an image is displayed on the display and viewed directly without any optical combiner.

Throughout the present disclosure, the term "image content" refers to visual information represented in an image frame, including rendered graphical elements and other visual features presented on the display, irrespective of whether corresponding pixel-level image data is available.

The present disclosure also relates to the method as described above. Various embodiments and variants disclosed above, with respect to the aforementioned first aspect, apply mutatis mutandis to the method.

Optionally, obtaining the motion information comprises retrieving the motion information from a compressed video stream used to generate the sequence of at least two image frames. Additionally or alternatively, optionally, obtaining the motion information comprises receiving the motion information from an image generation unit that generates the sequence of at least two image frames.

Moreover, in some implementations, the display is not a head-mounted display, and the motion information comprises motion vectors, wherein obtaining the motion information comprises:

obtaining information indicative of a head movement of a user; and calculating the motion vectors based at least in part on the head movement, to represent motion of the image content in a same direction as the head movement.

By doing so, the method accounts for apparent motion of image content induced by user movement relative to the image plane, thereby maintaining parallax-consistent spatial stability of image content rendered at a given perceived depth. The method enables the predicted backlight state to remain temporally aligned with the user-perceived position of the image content during head movement, supporting low-latency backlight control without motion-induced misalignment artifacts.

In some sub-implementations, the display is an autostereoscopic display, wherein, for image content anchored to a real-world object, the motion vectors are calculated based further on a perceived distance of the image content from the user. By doing so, the method accounts for depth-dependent parallax effects associated with user movement relative to the display. As a result, the predicted backlight state remains spatially aligned with depth-varying apparent motion of image content anchored to real-world objects, supporting consistent backlight behaviour across multiple perceived depths.

Furthermore, in some implementations, the display is an autostereoscopic display, wherein obtaining the motion information comprises:

obtaining motion information separately for different view images corresponding to different viewpoints; and combining the motion information obtained for the different view images.

By doing so, the method preserves view-dependent motion characteristics inherent to autostereoscopic image generation, and enables determination of a predicted backlight state that remains consistent across multiple views, supporting stable multi-view presentation without assuming identical motion across viewpoints.

Moreover, in some implementations, the display is an autostereoscopic display, wherein the method further comprises adjusting a crosstalk compensation applied to image data of the next image frame based at least in part on the predicted backlight state. By doing so, the method aligns view-separation processing with actual backlight emission conditions expected during presentation of the next image frame.

Furthermore, in some implementations, the display is mounted on a vehicle, and the motion information comprises motion vectors, wherein obtaining the motion information for image content not anchored to at least one of: the vehicle, a head of a user, the display comprises:

obtaining information indicative of a change in at least one of: a velocity, an acceleration, an orientation of the vehicle; and calculating the motion vectors based at least in part on the change in the at least one of: the velocity, the acceleration, the orientation of the vehicle.

By doing so, the method accounts for apparent image motion induced by vehicle dynamics rather than content motion itself. This allows predictive backlight control to remain aligned with perceived image movement during driving, thereby maintaining visual stability and low-latency backlight behaviour in vehicle-mounted display applications.

Moreover, in other implementations, the display is a head-mounted display worn by a user, and the motion information comprises motion vectors, wherein obtaining the motion information comprises:

obtaining information indicative of a head movement of the user; and calculating the motion vectors, based at least in part on the head movement, to represent motion of the image content in a direction opposite to a direction of the head movement.

By doing so, the method accurately models head-centric apparent motion inherent to head-mounted displays. This enables predictive backlight control to remain synchronized with perceived image motion during rapid head movements, thereby preserving visual stability and minimizing motion-to-photons latency in head-mounted display applications.

Furthermore, in some implementations, the display is an augmented-reality display, wherein obtaining the motion information for image content anchored to a real-world object comprises:

obtaining information indicative of a change in at least one of: a position, an orientation, a velocity, an acceleration of the real-world object; and calculating the motion vectors based at least in part on the change in the at least one of: the position, the orientation, the velocity, the acceleration of the real-world object.

By doing so, the method ensures that motion information accurately reflects object-induced apparent motion of image content anchored to that real-world object. This allows predictive backlight control to remain spatially and temporally aligned with augmented-reality content registered to moving real-world objects, thereby preserving visual coherence and reducing perceived latency in dynamic AR scenarios.

Moreover, optionally, the motion information comprises motion vectors having a spatial resolution lower than a spatial resolution of image data of the sequence of at least two image frames. As a result, the method reduces computational complexity and data bandwidth associated with motion processing while still capturing motion information at a granularity relevant to backlight control.

Furthermore, optionally, controlling the plurality of backlight regions comprises applying temporal conditioning to the respective emission levels for the plurality of backlight regions. By doing so, the method reduces abrupt temporal variations in backlight emission, thereby mitigating flicker and other temporal artifacts during dynamic content changes. This enables smooth and visually stable backlight behaviour while preserving the low-latency benefits of predictive backlight control.

Additionally, optionally, when applying the temporal conditioning, an increase in an emission level of a backlight region and a decrease in the emission level of the backlight region are applied differently. By doing so, the method enables direction-dependent control of backlight transitions, reducing perceptually disturbing artifacts such as overshoot or pumping. This improves temporal stability and visual smoothness of the backlight under rapidly changing predicted backlight states.

Moreover, optionally, the method further comprises adjusting pixel intensity values of pixels located within a region of the next image frame corresponding to a given backlight region based at least in part on an emission level of the given backlight region as indicated by the predicted backlight state. By doing so, the method maintains correct combined luminance of pixel modulation and backlight emission without waiting for backlight analysis of the next image frame.

DETAILED DESCRIPTION OF THE DRAWINGS

FIG. 1A is a schematic illustration of a display system 100 for controlling emission levels of a plurality of backlight regions in a backlight unit of a display, in accordance with an embodiment of the present disclosure. The display system 100 comprises a display 102 comprising a backlight unit 104 that includes a plurality of backlight regions 106 that are individually controllable, and at least one processor depicted as a processor 108. The display 102 may further comprise other components, for example, such as a panel 110 having an array of pixels.

The processor 108 is configured to:

obtain motion information indicating motion of image content across a sequence of at least two image frames;

determine, based on the motion information, a predicted backlight state for a next image frame to be presented on the display 102, wherein the predicted backlight state indicates respective emission levels for the plurality of backlight regions 106; and control the plurality of backlight regions 106 for presentation of the next image frame on the display 102, based on the predicted backlight state.

It may be understood by a person skilled in the art that FIG. 1A includes a simplified example implementation of the system 100 and how it works, for sake of clarity, which should not unduly limit the scope of the claims herein. It is to be understood that the specific implementation of the system 100 is not to be construed as limiting it to specific numbers or types of displays, backlight units, backlight regions and processors. The person skilled in the art will recognize many variations, alternatives, and modifications of embodiments of the present disclosure.

Figure 1B:
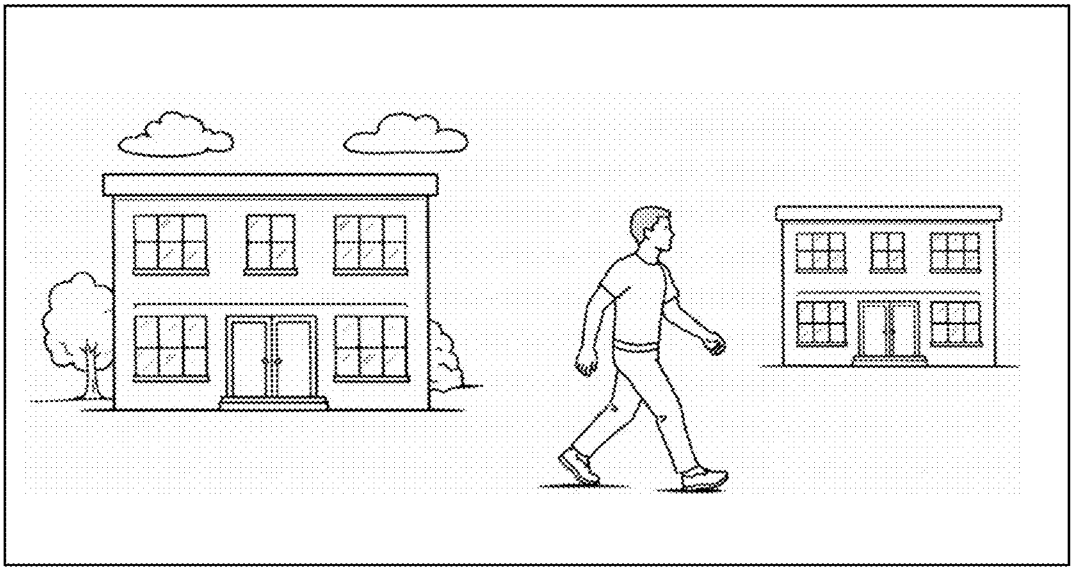
Figure 1C:
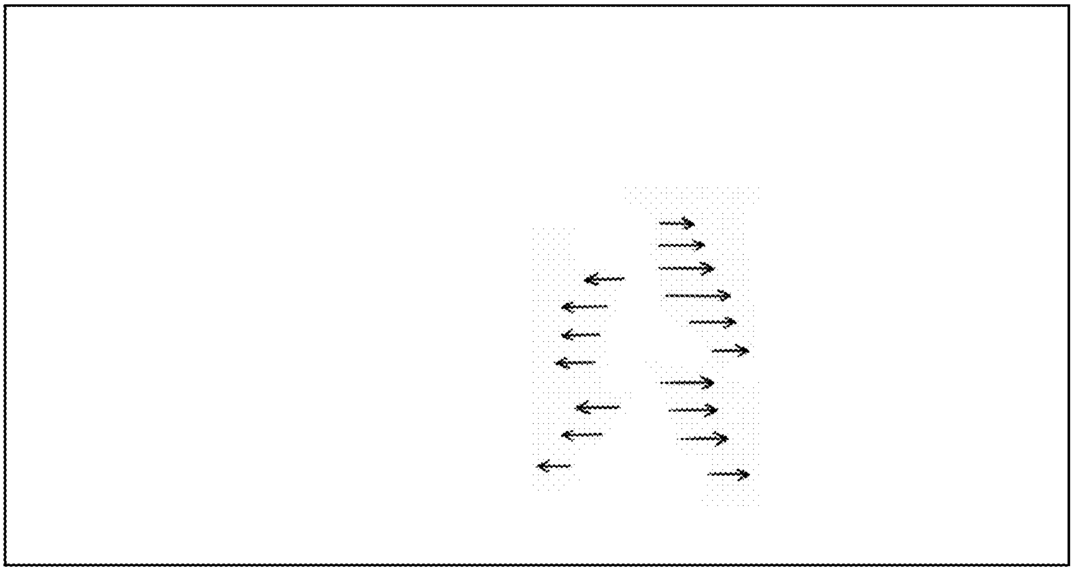
FIG. 1C depicts an example map depicting motion information, in accordance with an embodiment of the present disclosure.

FIG. 1B depicts an example image frame showing a person crossing a street in the foreground and a few buildings in the background, wherein the example image frame is part of the sequence of at least two images. In some implementations, motion information indicating motion of image content across the sequence of at least two image frames comprises motion vectors. FIG. 1C depicts an example map representing the motion vectors, in accordance with an embodiment of the present invention. This motion information is used to determine the predicted backlight state for the next image frame to be presented on the display 102. The plurality of backlight regions 106 are then controlled for presentation of the next image frame on the display 102, based on the predicted backlight state. FIGS. 1B and 1C are merely examples, which should not unduly limit the scope of the claims herein. The person skilled in the art will recognize many variations, alternatives, and modifications of embodiments of the present disclosure.

Figure 2:
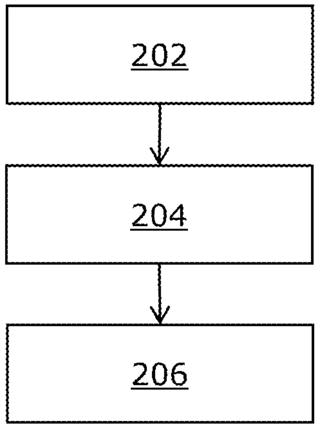
FIG. 2 depicts steps of a method for controlling emission levels of a plurality of backlight regions in a backlight unit of a display, in accordance with an embodiment of the present disclosure.

Referring to FIG. 2, illustrated are steps of a method for controlling emission levels of a plurality of backlight regions in a backlight unit of a display, in accordance with an embodiment of the present disclosure. At step 202, motion information indicating motion of image content across a sequence of at least two image frames is obtained. At step 204, a predicted backlight state is determined, based on the motion information, for a next image frame to be presented on a display. The display comprises a backlight unit that includes a plurality of backlight regions that are individually controllable, wherein the predicted backlight state indicates respective emission levels for the plurality of backlight regions. At step 206, the plurality of backlight regions are controlled for presentation of the next image frame on the display, based on the predicted backlight state.

The aforementioned steps are only illustrative and other alternatives can also be provided where one or more steps are added, without departing from the scope of the claims herein.

The invention claimed is:

1. A display system comprising:

a display comprising a backlight unit that includes a plurality of backlight regions that are individually controllable; and at least one processor configured to:

obtain motion information indicating motion of image content across a sequence of at least two image frames;

determine, based on the motion information, a predicted backlight state for a next image frame to be presented on the display, wherein the predicted backlight state indicates respective emission levels for the plurality of backlight regions; and control the plurality of backlight regions for presentation of the next image frame on the display, based on the predicted backlight state.

2. The display system of claim 1, wherein, when obtaining the motion information, the at least one processor is configured to retrieve the motion information from a compressed video stream used to generate the sequence of at least two image frames.

3. The display system of claim 1, wherein, when obtaining the motion information, the at least one processor is configured to receive the motion information from an image generation unit that generates the sequence of at least two image frames.

4. The display system of claim 1, wherein the display is not a head-mounted display, the motion information comprises motion vectors, and wherein, when obtaining the motion information, the at least one processor is configured to:

obtain information indicative of a head movement of a user; and calculate the motion vectors based at least in part on the head movement, to represent motion of the image content in a same direction as the head movement.

5. The display system of claim 4, wherein the display is an autostereoscopic display, and wherein, for image content anchored to a real-world object, the motion vectors are calculated based further on a perceived distance of the image content from the user.

6. The display system of claim 1, wherein the display is an autostereoscopic display, and wherein, when obtaining the motion information, the at least one processor is configured to:

obtain motion information separately for different view images corresponding to different viewpoints; and combine the motion information obtained for the different view images.

7. The display system of claim 1, wherein the display is an autostereoscopic display, and wherein the at least one processor is configured to adjust a crosstalk compensation applied to image data of the next image frame based at least in part on the predicted backlight state.

8. The display system of claim 1, wherein the display is mounted on a vehicle, wherein the motion information comprises motion vectors, and wherein, when obtaining the motion information for image content not anchored to at least one of: the vehicle, a head of a user, the display, the at least one processor is configured to:

obtain information indicative of a change in at least one of: a velocity, an acceleration, an orientation of the vehicle; and calculate the motion vectors based at least in part on the change in the at least one of: the velocity, the acceleration, the orientation of the vehicle.

9. The display system of claim 1, wherein the display is a head-mounted display worn by a user, wherein the motion information comprises motion vectors, and wherein, when obtaining the motion information, the at least one processor is configured to:

obtain information indicative of a head movement of the user; and calculate the motion vectors, based at least in part on the head movement, to represent motion of the image content in a direction opposite to a direction of the head movement.

10. The display system of claim 1, wherein the display is an augmented-reality display, and wherein, when obtaining the motion information for image content anchored to a real-world object, the at least one processor is configured to:

obtain information indicative of a change in at least one of: a position, an orientation, a velocity, an acceleration of the real-world object; and calculate the motion vectors based at least in part on the change in the at least one of: the position, the orientation, the velocity, the acceleration of the real-world object.

11. The display system of claim 1, wherein the motion information comprises motion vectors having a spatial resolution lower than a spatial resolution of image data of the sequence of at least two image frames.

12. The display system of claim 1, wherein, when controlling the plurality of backlight regions based on the predicted backlight state, the at least one processor is configured to apply temporal conditioning to the respective emission levels for the plurality of backlight regions.

13. The display system of claim 12, wherein, when applying the temporal conditioning, an increase in an emission level of a backlight region and a decrease in the emission level of the backlight region are applied differently.

14. The display system of claim 1, wherein the at least one processor is configured to adjust pixel intensity values of pixels located within a region of the next image frame corresponding to a given backlight region based at least in part on an emission level of the given backlight region as indicated by the predicted backlight state.

15. A method comprising:

obtaining motion information indicating motion of image content across a sequence of at least two image frames;

determining, based on the motion information, a predicted backlight state for a next image frame to be presented on a display, wherein the display comprises a backlight unit that includes a plurality of backlight regions that are individually controllable, wherein the predicted backlight state indicates respective emission levels for the plurality of backlight regions; and controlling the plurality of backlight regions for presentation of the next image frame on the display, based on the predicted backlight state.

16. The method of claim 15, wherein the display is not a head-mounted display, the motion information comprising motion vectors, wherein obtaining the motion information comprises:

obtaining information indicative of a head movement of a user; and calculating the motion vectors based at least in part on the head movement, to represent motion of the image content in a same direction as the head movement.

17. The method of claim 15, wherein the display is mounted on a vehicle, the motion information comprising motion vectors, wherein obtaining the motion information for image content not anchored to at least one of: the vehicle, a head of a user, the display comprises:

obtaining information indicative of a change in at least one of: a velocity, an acceleration, an orientation of the vehicle; and calculating the motion vectors based at least in part on the change in the at least one of: the velocity, the acceleration, the orientation of the vehicle.

18. The method of claim 15, wherein the display is a head-mounted display worn by a user, the motion information comprising motion vectors, wherein obtaining the motion information comprises:

obtaining information indicative of a head movement of the user; and calculating the motion vectors, based at least in part on the head movement, to represent motion of the image content in a direction opposite to a direction of the head movement.

19. The method of claim 15, wherein the display is an augmented-reality display, wherein obtaining the motion information for image content anchored to a real-world object comprises:

obtaining information indicative of a change in at least one of: a position, an orientation, a velocity, an acceleration of the real-world object; and calculating the motion vectors based at least in part on the change in the at least one of: the position, the orientation, the velocity, the acceleration of the real-world object.

20. The method of claim 15, further comprising adjusting pixel intensity values of pixels located within a region of the next image frame corresponding to a given backlight region based at least in part on an emission level of the given backlight region as indicated by the predicted backlight state.

* * * * *